US006957189B2

(12) United States Patent
Poage et al.

(10) Patent No.: US 6,957,189 B2
(45) Date of Patent: Oct. 18, 2005

(54) APPARATUS AND METHOD FOR CREATING A MARKETING INITIATIVE

(75) Inventors: James B. Poage, Euless, TX (US); Christian Walentine, Grapevine, TX (US); David Alan Hobt, Flower Mound, TX (US); Victor Alan Nilson, Southlake, TX (US)

(73) Assignee: Sabre Inc., Southlake, TX (US)

( * ) Notice: Subject to any disclaimer, the term of this patent is extended or adjusted under 35 U.S.C. 154(b) by 0 days.

(21) Appl. No.: 09/385,414

(22) Filed: Aug. 30, 1999

(65) Prior Publication Data

US 2002/0123922 A1 Sep. 5, 2002

(51) Int. Cl.[7] .............................................. G06F 17/60
(52) U.S. Cl. ........................................ 705/10; 705/14
(58) Field of Search ....................................... 705/10, 14

(56) References Cited

U.S. PATENT DOCUMENTS

| | | | | | |
|---|---|---|---|---|---|
| 4,908,761 | A | * | 3/1990 | Tai ............................. | 235/376 |
| 5,191,523 | A | | 3/1993 | Whitesage ................... | 364/407 |
| 5,237,499 | A | | 8/1993 | Garback ...................... | 364/407 |
| 5,311,425 | A | | 5/1994 | Inada .......................... | 364/407 |
| 5,467,268 | A | | 11/1995 | Sisley et al. ................. | 364/401 |
| 5,570,283 | A | | 10/1996 | Shoolery et al. ............. | 364/407 |
| 5,630,127 | A | * | 5/1997 | Moore et al. ................. | 705/10 |
| 5,721,831 | A | * | 2/1998 | Waits et al. .................. | 705/10 |
| 5,832,454 | A | | 11/1998 | Jafri et al. ..................... | 705/6 |
| 5,857,175 | A | * | 1/1999 | Day et al. ..................... | 705/10 |
| 5,923,252 | A | * | 7/1999 | Sizer et al. ................... | 340/567 |
| 5,948,061 | A | * | 9/1999 | Merriman et al. ............ | 705/14 |
| 5,974,396 | A | * | 10/1999 | Anderson et al. ............ | 705/10 |
| 6,078,892 | A | * | 6/2000 | Anderson et al. ............ | 705/10 |
| 6,230,143 | B1 | * | 5/2001 | Simons et al. ............... | 705/14 |
| 6,233,564 | B1 | * | 5/2001 | Schulze, Jr. .................. | 705/14 |
| 6,236,977 | B1 | * | 5/2001 | Verba et al. .................. | 705/10 |
| 6,286,005 | B1 | * | 9/2001 | Cannon ....................... | 707/100 |
| 6,334,110 | B1 | * | 12/2001 | Walter et al. ................. | 705/14 |
| 6,374,251 | B1 | * | 4/2002 | Fayyad et al. ................ | 345/772 |
| 6,605,121 | B1 | * | 8/2003 | Roderick ..................... | 715/513 |

FOREIGN PATENT DOCUMENTS

WO    WO 9849640 A   * 11/1998   .......... G06F/17/60

OTHER PUBLICATIONS

Saarenvirta, Gary. "Data Mining for Direct Mail: A Lesson in Predictive Modeling," Intelligence Enterprise, Mar. 9,1999 [retrieved from Dialog].*
Frawley et al. "Increasing customer value by integrating data mining and campaign management software," Direct Marketing, Feb. 1999 [retrieved from Dialog].*
Lowenstein, Joanna. "The new database dynamic, "Folio: the Magazine for Magazine Management, Sep. 15, 1998 [retrieved from Dialog].*
Westergren, Jeffrey M. "Datamining: The key to one–to–one marketing," Bank Marketing, Feb. 1996.*
Van Auken et al. "An Empirical Analysis of Small Business Advertising," Journal of Small Business Management v30n2, Apr. 1992.*
Wyner, Gordon A. "Database Research," Marketing Research: A Magazine of Management & Applications, vol. 8 No. 1, Spring 1996, pp. 60–63.*
Rowsom, Michael. "Bridging the gap from traditional marketing to electronic commerce," Direct Marketing, vol. 60 No. 9, Jan. 1998, pp. 23–25.*
Hodges, Jane. "A new tool for targeted Web selling," Business Marketing vol. 82 No. 4, May 1997, p. 18.*

* cited by examiner

*Primary Examiner*—Tariq R. Hafiz
*Assistant Examiner*—Catherine M Colón
(74) *Attorney, Agent, or Firm*—Alston & Bird LLP

(57) ABSTRACT

An apparatus and method for creating or presenting marketing initiatives in a sales manager system. A user inputs offer parameters for a new initiative. The offer parameters includes an initiative time period and an initiative description. After the parameters have been entered, customer selection criteria is associated with those parameters. The effectiveness of the new initiative is determined using stored statistics associated with past initiatives, after which, the new initiative is complete and is stored in a database.

16 Claims, 8 Drawing Sheets

APPARATUS AND METHOD FOR CREATING A MARKETING INITIATIVE

FIELD OF THE INVENTION

This invention relates to the general field of computerized reservation systems such as the airline reservation systems used by airline ticket agents, and more particularly, to a system and method for providing service and product offers that are customized to a particular customer.

BACKGROUND OF THE INVENTION

A computerized reservation system (CRS) traditionally has provided a communications network for travel agents or other persons to book airline reservations. Other companies may interface their computer systems with a CRS in order to make information concerning their services available via the CRS. For example, a hotel company may interface its reservation system with a CRS so that when a person books an airline reservation, he or she may also make a hotel reservation through the same network.

The major computerized reservation systems currently in use worldwide share a common heritage and have common business assumptions that were true 20 years ago. Examples of such reservation systems are known under the following trade names and companies: SABRE; AMADEUS; WORLDSPAN; SYSTEM ONE; APOLLO; GEMINI; GALILEO; and AXESS. Using the current systems, a customer chooses an itinerary, based on their desired travel dates and times, then books this itinerary.

Growth and deregulation in the travel industry, and in particular, the airline industry has resulted in a shift of traditional customer shopping patterns. Over the past several years, travelers have determined that there is little difference in service levels between major airlines, with price being the major factor in the shopping process. With the perception of roughly equal service levels, customer service and customer relationships become far more important.

In today's computer reservations environment, the vast majority of customers are treated identically. The customer requests travel space, and such space, if available is booked for the customer, along with any destination requirements such as hotel reservations and car rentals. The majority of preferences the customer may have must be re-stated each time the customer travels, and the reservations environment usually has no knowledge of special events or offers that may be of interest to the customer.

Accordingly, a need exists for a system that provides service and product offers that are tailored either to some aspect of the customer's journey or tailored even to the individual customer. At the minimum, this enhances the traveler's sales experience with the vendor, an in the best case, the customer's entire trip is enhanced by the tailored offers that were provided at the time of sale.

SUMMARY OF THE INVENTION

A method consistent with the present invention creates a marketing initiative in a sales manager system. In this method, a user inputs offer parameters for a new initiative. The offer parameters include initiative dates and an initiative description. Customer selection criteria is then associated with the offer parameters. The effectiveness of the new initiative is determined using stored statistics associated with past initiatives, after which, the new initiative is complete and is stored in a database.

An apparatus consistent with the present invention provides for a sales manager system including a sales manager workstation for creating a marketing initiative comprising a sales manager workstation controller including means for entering offer parameters for a new initiative and means for associating customer selection criteria with the offer parameters, and a trend analysis unit using stored statistics associated with past initiatives to determine the effectiveness of the new initiative. Thereafter, the new initiative is stored in a database.

Another apparatus consistent with the present invention provides for a sales manager system comprising a sales manager workstation for creating a marketing initiative. The sales manager workstation includes a sales manager workstation controller including means for entering offer parameters for a new initiative and means for associating customer selection criteria with the offer parameters, a trend analysis unit using stored statistics associated with past initiatives to determine the effectiveness of the new initiative, and an impact analysis unit for determining the impact of the new initiative on other newly input initiatives or initiatives already existing. The sales manager system also includes a decision support subsystem (DSS) database connected to the sales manager workstation for storing the new initiative, a runtime offers subsystem connected to the DSS database for using information from a customer request to determine a most targeted initiative, and a marketing host connected to the runtime offers subsystem. The marketing host includes means for sending customer requests to the runtime offers subsystem.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The present invention relates to an apparatus and method for creating, maintaining and applying marketing initiatives to sales and availability requests. Marketing initiatives are advertisements, sales presentations, and the like that a vendor shows a customer to attempt to persuade the customer to use or buy the vendor's service or product. New initiatives are analyzed to determine their projected effectiveness and impact on other initiatives. Based on this analysis, the new initiatives are selectively stored in a database. These initiatives are applied to sales and availability requests from customers. The most relevant initiatives are presented to the customers.

Figure 1:
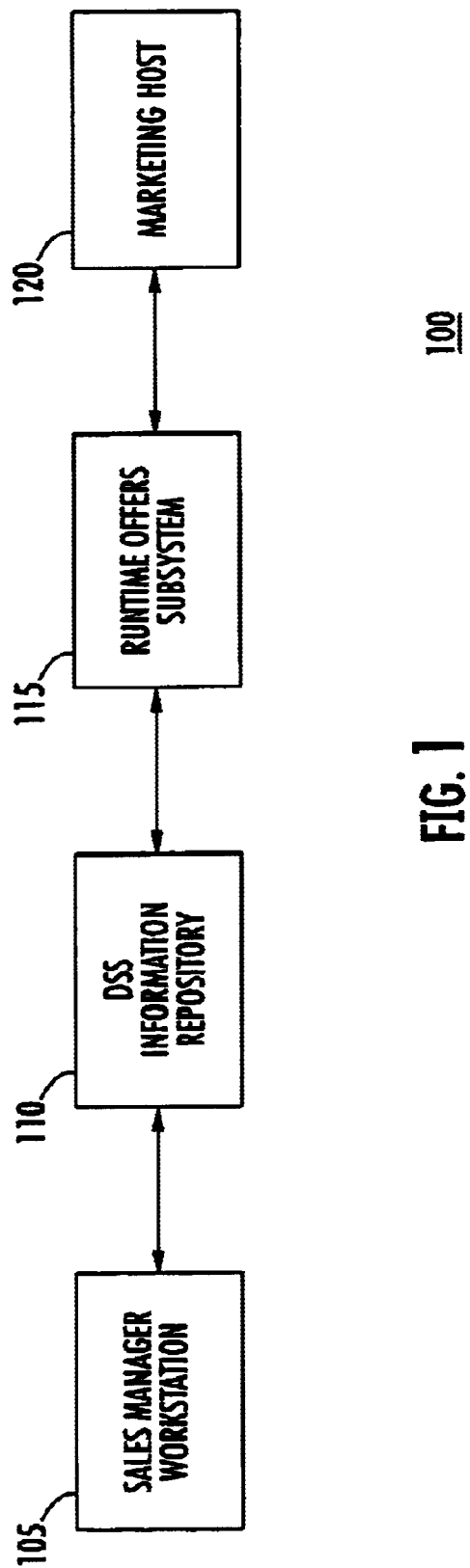
FIG. 1 is a diagram of a sales manager system consistent with one embodiment of the present invention.

FIG. 1 shows an example of a sales manager system 100 consistent with the present invention. As can be seen, the sales manager system 100 has a sales manager workstation 105 coupled to a decision support subsystem (DSS) information repository 110. This allows a user of the sales manager workstation 105 to edit, view, retrieve, input, evaluate and perform other management functions on the data stored in the centrally located DSS information repository 110. In one embodiment, sales manager workstation 105 is a web-based application that may be accessible from a customer's own Internet/Intranet application or from a host's site. A runtime offers subsystem 115 is communicably attached to DSS information repository 110 and a marketing host 120. In one embodiment of the present invention, the marketing host 120 is one or more of several CRS's. DSS information repository 110 is preferably a relational database with automatic retention to avoid forcing a user to re-enter similar data repeatedly.

Data entered via sales manager workstation 105 consists of marketing initiatives and the trigger values that will determine application of the initiatives to specific requests for availability or sale of the marketing host's 120 inventory. At specific time intervals, the initiatives within DSS information repository 110 are extracted and transmitted to runtime offers subsystem 115. Runtime offers subsystem 115 compresses the trigger values for performance reasons and stores the new marketing initiatives in a local, performance oriented form.

Availability and sales requests for inventory within marketing host 120 are communicated to runtime offers subsystem 115, which uses information imbedded in the requests to locate the most targeted initiative. If such an initiative is located, it is returned to marketing host 120. The most targeted initiative is selected based on various criteria. Examples of such criteria are point of sale (POS), origin and destination (O&D), flight information, traveler loyalty membership and level, and channel. POS refers to the locations where the sale occurs. O&D refers to the starting and ending points of the trip. Flight information refers to specifics of the flight such as passenger information, class of ticket, etc. Traveler loyalty membership and level refers to any frequent traveler program to which a customer might belong. Channel refers to the type of site where the sale occurs (i.e., travel agency, Internet booking site, corporate Intranet booking site). Runtime offers subsystem 115 maintains usage and application statistics for all marketing initiatives.

Figure 2:
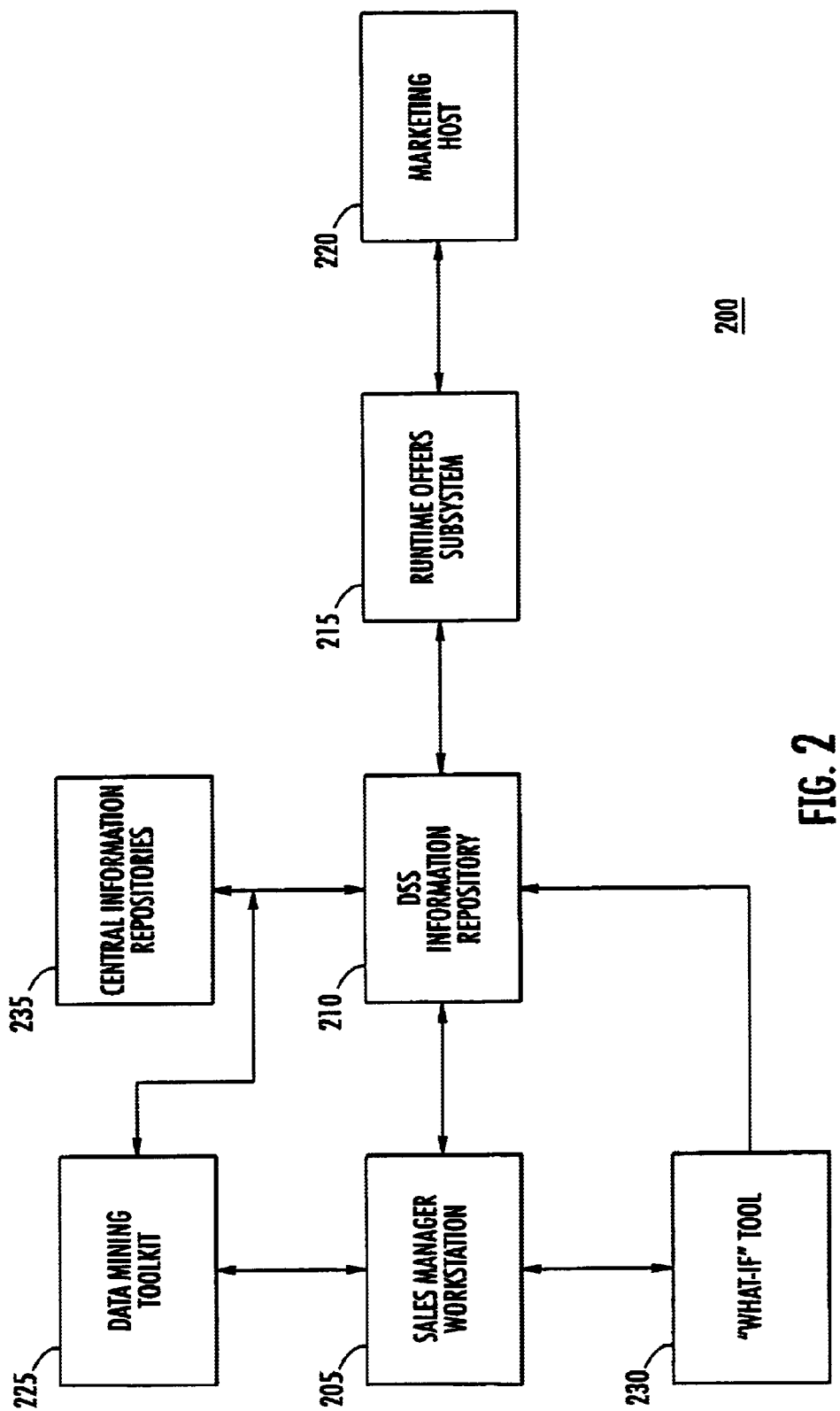
FIG. 2 is a diagram of a sales manager system consistent with another embodiment of the present invention.

FIG. 2 shows a sales manager system 200 in one embodiment, which can be maintained on a UNIX-based, or equivalent computer platform. A sales manager decision support subsystem consists of a sales manager workstation 205, a "What-if" tool 230, and data mining toolkit 225 all communicably attached to DSS information repository 210. DSS information repository 210 is also capable of receiving customer information from a plurality of centrally located information repositories 235 providing the user with specific information about the marketing host's 220 customers. Sales manager runtime offers subsystem 215 consists of a runtime offer compiler, a runtime offer information repository, and a runtime offer evaluator as explained below with reference to FIG. 3. Runtime offers subsystem 215 is communicably attached to the DSS information repository 210 and the marketing host 220.

Marketing initiatives are created via a user interface at sales manager workstation 205. In the creation process, the user may invoke data mining toolkit 225 to gather information relevant to the initiative. When the initiative is complete, the user invokes "What-if" tool 230 to determine market impact and probable effectiveness of the initiative. "What-if" tool 230 also may perform analysis against existing initiatives. Once the user is satisfied with the initiative, it is committed to DSS information repository 210, where the runtime offers subsystem 215 can access it. Incentives are generally stored in DSS information repository 210 under categories such as origin and destination information, travel information, and traveler information. DSS information repository 210 also contains all active marketing initiatives, prior marketing initiatives, usage statistics, analysis results, and contracts in force and expired.

Figure 3:
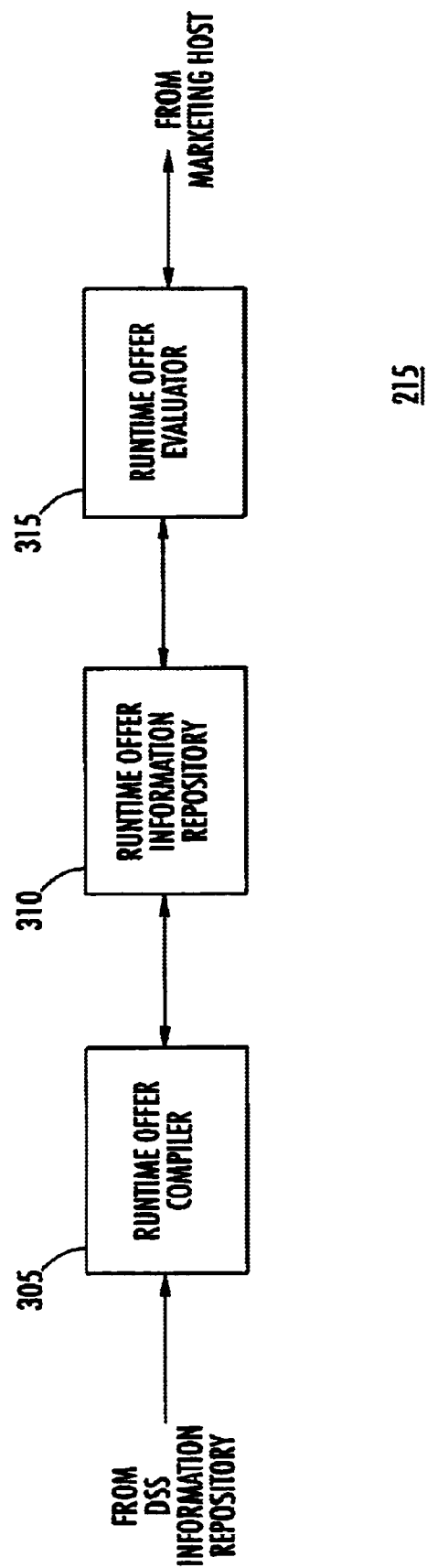
FIG. 3 is a diagram of a runtime offers subsystem consistent with the present invention.

FIG. 3 shows an example of the architecture for runtime offers subsystem 215 consistent with the present invention. At specified time intervals, runtime offer compiler 305 extracts new and updated marketing initiatives from DSS information repository 210. Marketing initiatives are formatted and transferred to the runtime offer information repository 310. Marketing initiative trigger values are used to create 'key-paths', which are then also transmitted to runtime offer information repository 310. Key-paths are data structures that are a collection of the possible combinations of trigger values. Runtime offer information repository 310 is a relational database similar in structure to the DSS information repository 210. Generally, runtime offer information repository 310 contains all currently active marketing initiatives, a key-path index, and usage statistics. The key-path index is used to access the repository.

Runtime offer evaluator 315 receives sale and availability requests from marketing host 220. Key values are extracted from these requests and converted to the 'key-path' format, matching the marketing initiative 'key-paths' created by the runtime offer compiler 305. Key values are the relevant information from requests that might trigger initiatives. The key-paths are then matched against those in runtime offer information repository 310. This is an iterative process, with runtime offer evaluator 315 attempting all possible combinations (including and excluding the entire range of trigger values present in the host-generated message) to generate key-paths.

Sales Manager Workstation

Figure 4:
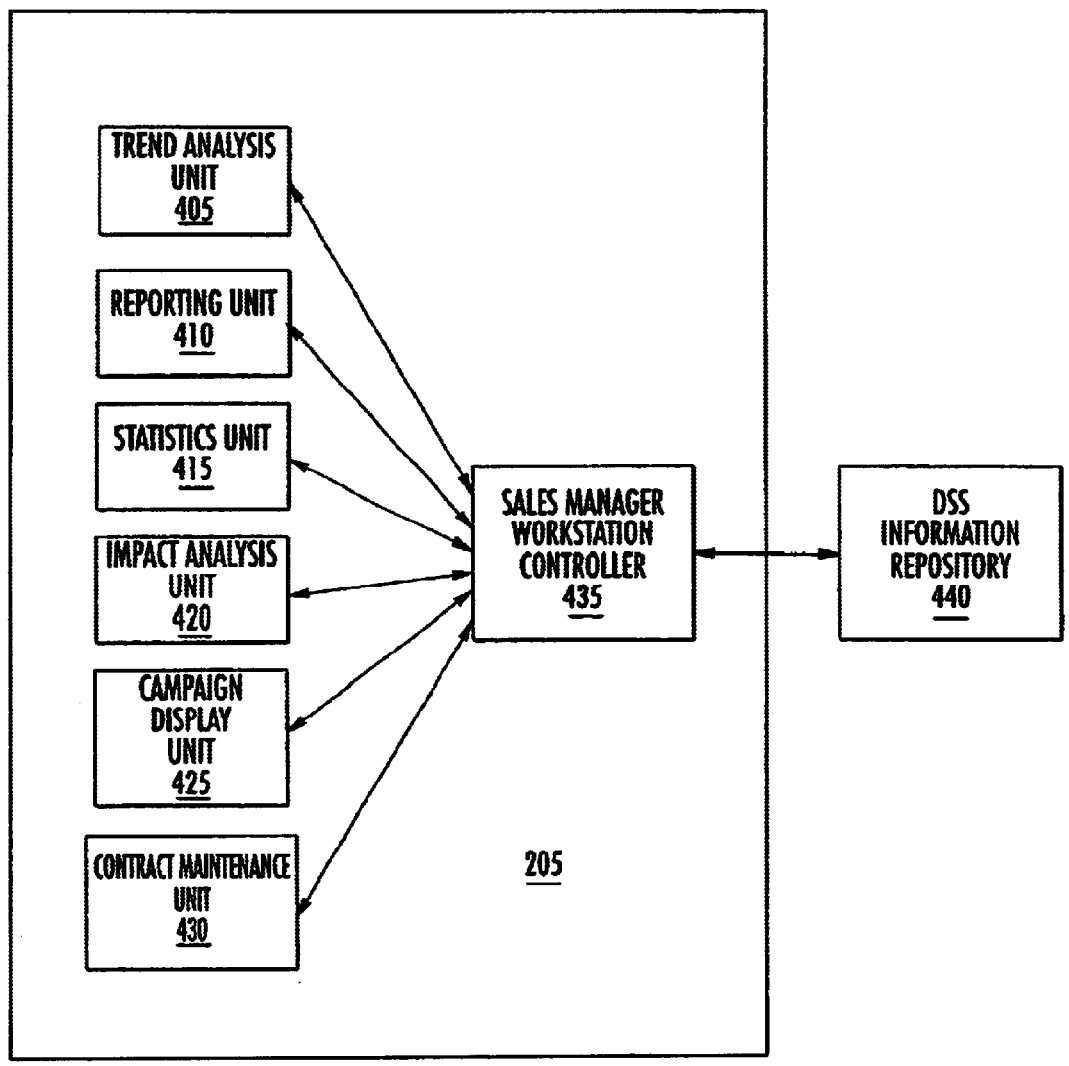
FIG. 4 is a diagram of a sales manager workstation consistent with the present invention.

FIG. 4 shows the components that comprise sales manager workstation 205 according to one embodiment of the present invention. Sales manager workstation 205 is composed of a trend analysis unit 405, a reporting unit 410, a statistics unit 415, an impact analysis unit 420, a campaign display unit 425, and a contract maintenance unit 430. These units are communicably attached to the sales manager workstation controller 435. Additionally, sales manager workstation controller 435 is communicably attached to DSS information repository 440. Sales manager workstation controller 435 coordinates the processing of the different units. A user of sales manager workstation 205 may utilize any or all of these units, the functions of which are described below, in order to create or maintain a marketing initiative.

Trend analysis unit 405 utilizes aggregated statistics from past initiatives to determine previous marketing trends and to forecast the effectiveness of planned, but not yet implemented initiatives. Generally, aggregated statistics used in the forecasting process include message hit rates both by composite key-paths and individual key elements within the key-paths. This provides the ability to deduce the most effective individual keys as well as the most effective key combinations. Additionally, transactions which did not match current key-path criteria and returned to the marketing host without attached marketing messages are analyzed to determine if there exists significant lost opportunity that might be capitalized upon for future marketing campaigns. This analysis also utilizes information in the inbound transaction from the marketing host to determine what individual and composite keys might be effectively utilized in such future efforts. Reporting unit 410 provides a series of pre-formatted reports based upon marketing initiative activity, initiative creation, initiative demise, and initiative viewership. Additionally, dynamic, or ad-hoc reporting is performed using this module. Statistics unit 415 provides usage statistics for current and past initiatives, ratios of hit-to-miss for any or all initiatives, and provides graphing features to visually aid the trend analysis unit 405. Impact analysis unit 420 provides a visual means of determining the interaction and collision of marketing initiatives. Initiatives either newly input or existing on DSS information repository 440 are compared to provide information on which will be selected in any given host request. Campaign display unit 425 provides all pertinent information about a marketing initiative, including information related to initiative billing, initiative usage, and initiative vendor (or owner). Contract maintenance unit 430 allows the user to create a new initiative, including contractual obligations of the initiative vendor (or owner) in such a manner that a contract can be generated at or before initiative activation. By using these units in some combination, a user of the sales manager workstation 205 is able to effectively create and maintain initiatives that are more likely to be relevant to a given customer's needs.

Figure 5:
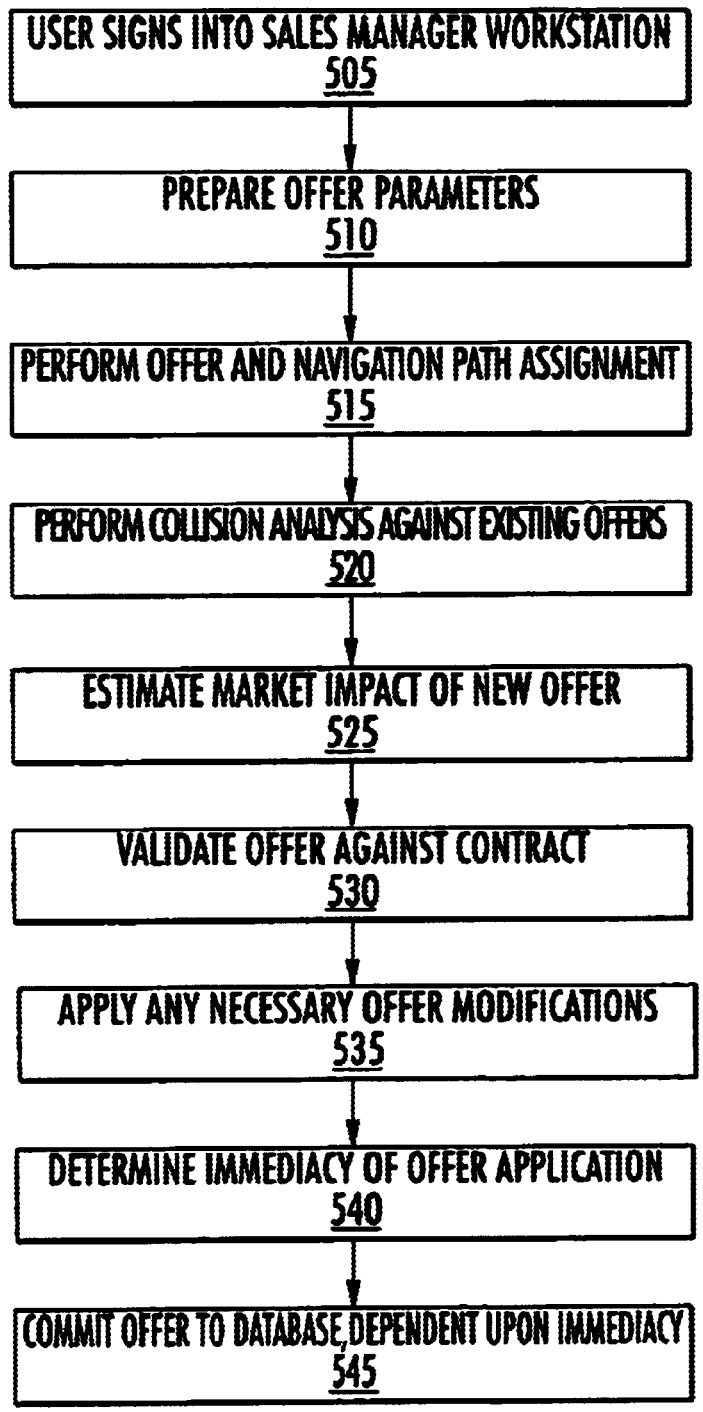
FIG. 5 is a flow chart of a process for creating or maintaining an initiative consistent with the present invention.

FIG. 5 shows a flowchart for creating or maintaining a marketing initiative in the sales manager system using the sales manager workstation. First, a user must sign into sales manager workstation 205 (step 505). The user signs in using well-known methods of logging into systems. In one embodiment, all users will not necessarily be allowed to access all workstation functions. It is possible to only allow some users access to functions that are relevant to that user. Alternatively, any user with a valid ID and password will have access rights to all functions. After signing in, the user prepares offer parameters (step 510). These parameters consist of initiative effective and expiration dates and the description of the initiative. Next, the user executes a routine to perform offer and navigation path assignment (step 515). This step involves the application of traveler, origin and destination, and travel parameters in order to ensure accurate initiative targeting. Specifically, certain parameters are associated with a new initiative, so that when a customer makes a request that includes these parameters, the initiative is retrieved.

Next, a routine is performed to analyze for collisions in existing offers (step 520). This step locates any messages in DSS information repository 210 that share key-path characteristics that would result in an initiative collision. These collisions are displayed for the user to assist in validating the initiative. In this manner, a user could decide whether or not to implement an initiative that is similar to an already existing one (i.e. targets the same or similar audience). It is useful to check for collisions because a user might not want to have multiple initiatives that are too similar. It is also possible that the user actually would prefer to have similar initiatives. After collision analysis has been performed, the market impact of the new offer is estimated (step 525). This step utilizes the statistics unit 415, the trend analysis unit 405, and the impact analysis unit 420 to accomplish this task. Specifically, these units are used to aid the user in determining the effectiveness and impact of a given initiative. Once the market impact has been estimated, the offer must be validated against contract (step 530). This step examines the marketing initiative and validates it against the contents of the related contracts. To accomplish this, contract maintenance unit 430 is invoked to gather pertinent contractual details. Any modifications that result from this step are applied in the next step, apply any necessary offer modifications (step 535). In other words, if a specific vendor has a contractual obligation to only target a certain type of customer, then the aforementioned step will change the initiative (if necessary), so that it does not contradict that obligation.

At this point, the initiative is complete. The user must then determine the immediacy of offer application (step 540). In this step, the user merely decides whether or not an offer needs to be put in to effect immediately. Once the user has made this decision, then the offer can be committed to the database dependent on the immediacy (step 545). If the initiative must be instantly loaded to runtime offer information repository 310, then the user must activate runtime offer compiler 305 for the message, forcing an immediate transmission to runtime offer information repository 310. If the initiative does not have to be immediately loaded, then it is committed to DSS information repository 210, to be applied to the runtime offer information repository 310 in the next time-initiated load cycle.

Figure 6:
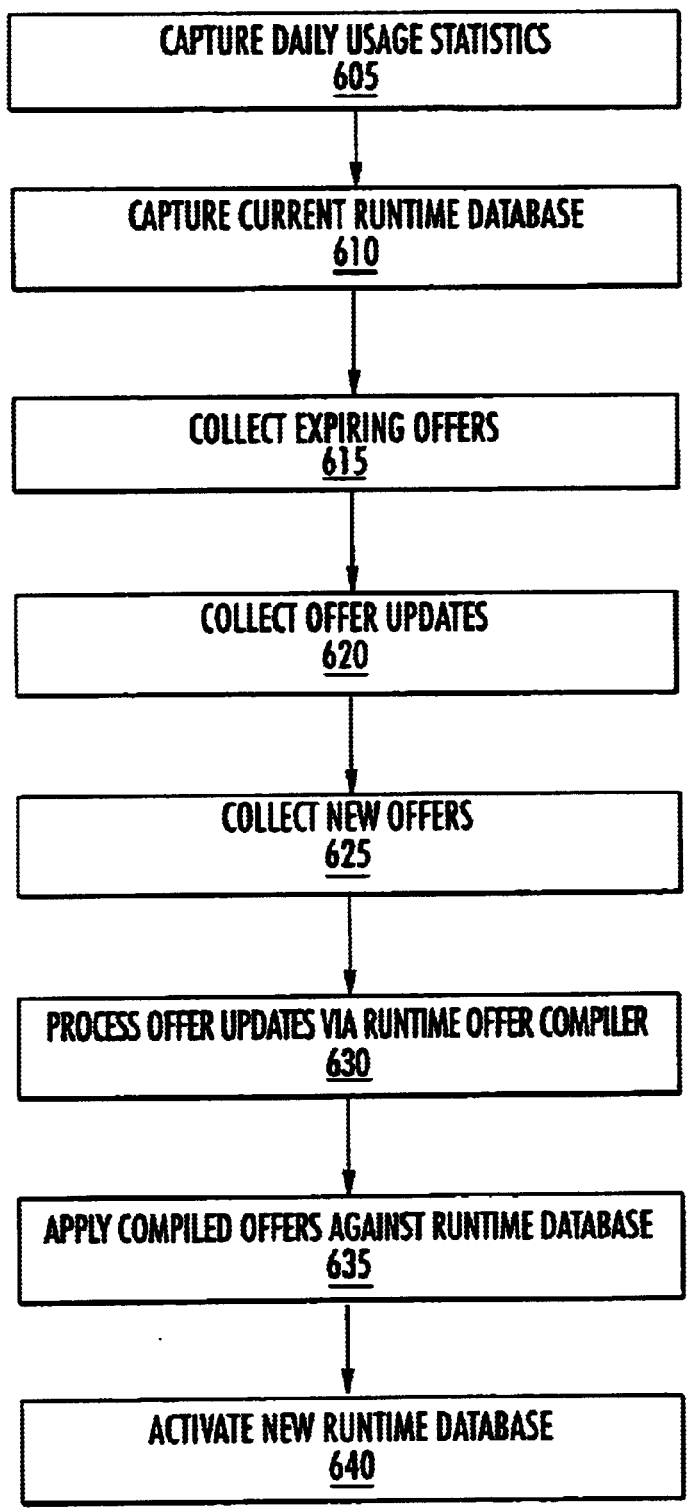
FIG. 6 is a flow chart of a process for a time-initiated load cycle consistent with the present invention.

FIG. 6 shows a flowchart that describes the time-initiated load cycle. This time-initiated load cycle preferably occurs at least nightly. The first step in the cycle is to capture daily usage statistics (step 605). This step captures, then resets, the usage counts for each active marketing initiative. These are transmitted to statistics unit 415. Once complete, the entire runtime offer information repository 310 is captured (step 610). This database copy is retained for emergencies.

At this point, database preparation begins with several steps for collecting information. First, the offers that are expiring are collected (step 615). The result of this step is an initiative purge list. These are initiatives that need to be deleted from the database because they are no longer effective. Next, offer updates are collected (step 620). The result of this step is an initiative updates list. Finally, the new offers are collected (step 625), so that an additions list can be generated.

Once the purge, updates, and additions list have been created, the lists are processed through runtime offer compiler 305 in order to create compiled initiatives to be applied to the new copy of runtime offer information repository 310 (step 630). The compiled initiatives are created in a manner consistent with normal runtime offer compiler processing. After the initiatives have been compiled, they are applied against runtime offer information repository (step 635). When complete, the new runtime offer information repository 310 will exist. The new database is then activated (step 640), so that all initiatives will be available to marketing host 220.

Runtime Offers Subsystem

Figure 7:
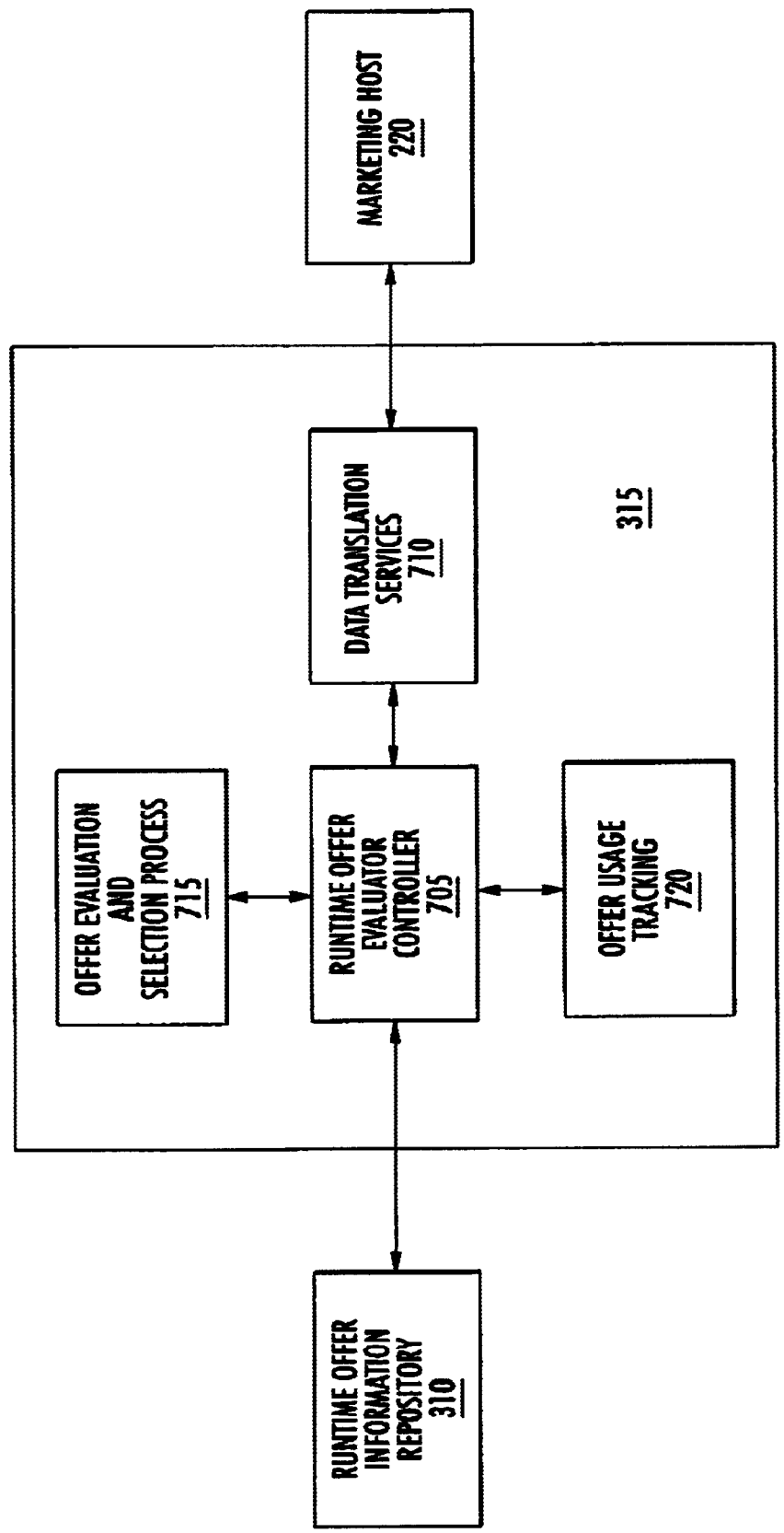
FIG. 7 is a diagram of a runtime offer evaluator consistent with the present invention.

FIG. 7 details the runtime offer evaluator of the runtime offers subsystem. Runtime offer evaluator 315 is comprised of offer evaluation and selection process 715, data translation services 710, runtime offer evaluator controller 705, and offer usage tracking 720. Runtime offer evaluator controller 705 controls the various modules of the runtime offer evaluator 315 and is communicably attached to runtime offer information repository 310, offer evaluation and selection process 715, data translation services 710, and offer usage tracking 720. Additionally, data translation services 710 is communicably attached to market host 220. Alternatively, runtime offer information repository 310 can be considered part of runtime offer evaluator 315.

Runtime offer information repository 310 is populated by runtime offer compiler 305 in the manner described with reference to FIG. 3. Marketing host 220 transmits sale and availability requests to runtime offers subsystem 315 that are received by data translation services 710. There, the inbound requests are translated into their suitable internal formats. Data translation services 710 then transmits the newly formatted data to the runtime offer evaluator controller 705. The runtime offer evaluator controller 705 utilizes offer evaluation and selection 715 and runtime offer information repository 310 to select the most accurate marketing initiative. Once selected, offer usage tracking 720 is activated to update initiative statistics. Generally, offer usage tracking 720 is used to track customer responses to requests and use this information to hone future marketing initiatives. Runtime offer evaluator controller 705 then re-activates data translation services 710 to respond with the selected marketing initiative to marketing host 220.

Figure 8:
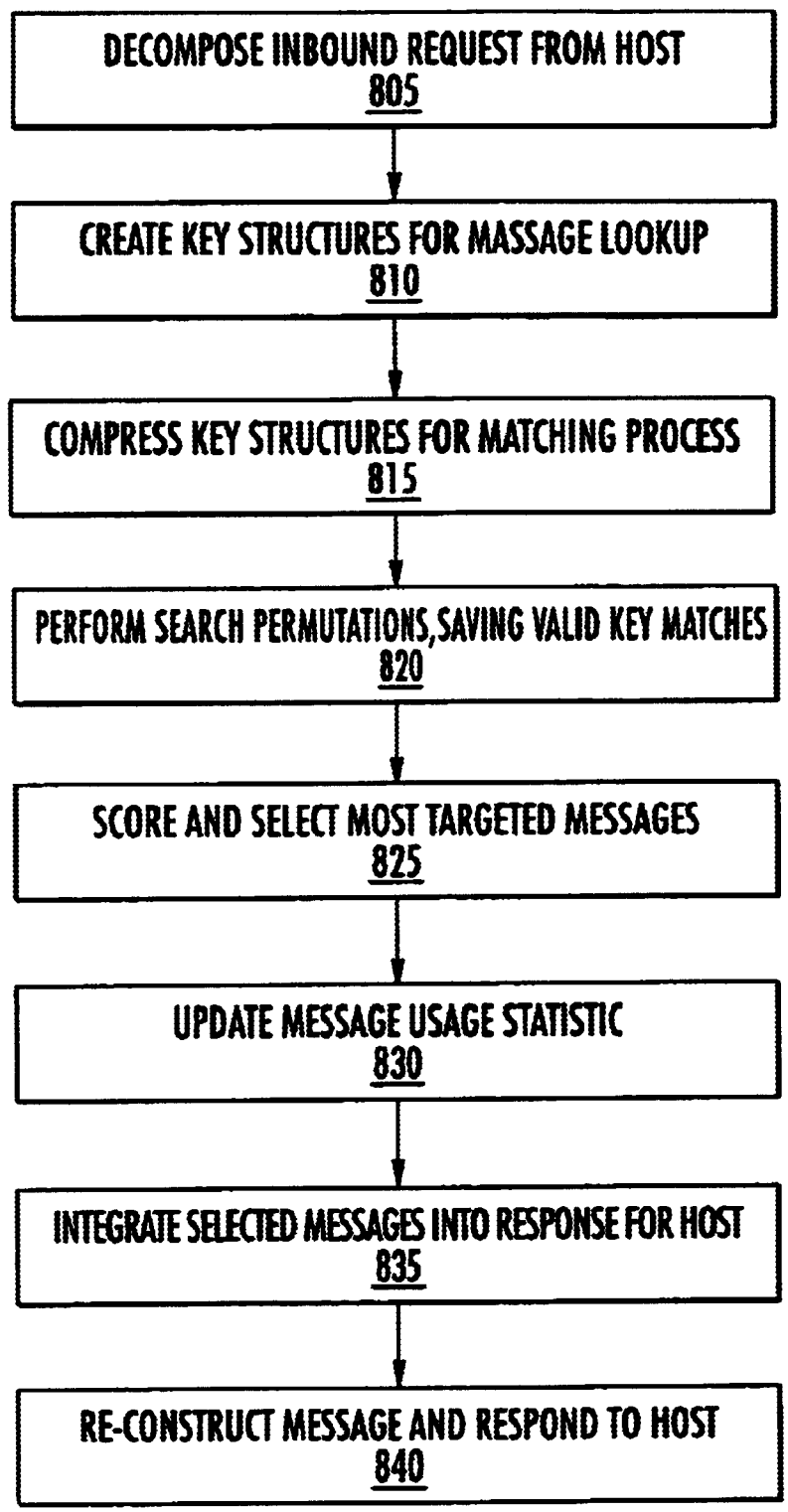
FIG. 8 is a flow chart of a process for evaluating initiatives against customer's requests consistent with the present invention.

FIG. 8 shows a flowchart detailing the process of evaluating offers against the marketing host's availability and sale requests. When marketing host 220 transmits a request to the Sales Manager, the inbound request is decomposed (step 805). Data translation services 710 performs the decomposition. In this step, the inbound message is parsed and key values extracted. The key values include the different customer selection criteria that are relevant to initiatives such as frequent traveler data, point of sale data, channel data, flight information, origin and destination, etc. More specifically, the following is a partial list of possible criteria: frequent traveler ID; distribution channel; CRS ID; travel agency ID; point of sale (POS) country code; POS city code; POS currency code; agency pseudo-city code; travel origin; travel destination; travel flight or conveyance identification; travel class of service; travel flight or conveyance embarkation point; travel flight or conveyance disembarkation point; and size of traveling party. Once the key values have been extracted from the request, data translation services 710 creates keys structures with them (step 810). In this step, the key values are formatted into internal data representations of the original values. Data translation services 710 sends the new key structures to runtime offer evaluator controller 705 along with the data size of these key structures.

Runtime offer evaluator controller 705 passes the key structures to the offer evaluation and selection process 715, where they are compressed to prepare for the matching process (step 815). In one embodiment, the compression occurs by first de-normalizing the key structures by combining the different information of the key structures into all possible combinations of data. The result of this de-normalization is a series of key-paths. These key-paths are then compressed by removing empty fields, and a mask is created indicating what fields remain in the key-path. The key-paths are to be matched against runtime offer information repository 310.

After the key-paths have been successfully compressed, the offer evaluation and selection process 715 performs the actual search for initiatives that are relevant to the request (step 820). In this step, the key-paths are included and excluded to form key-path combinations. Runtime offer information repository 310 is searched using the key-paths and key masks. With each iteration, any wholly or partially matching initiatives are saved, so that they can be used later to help determine which initiative(s) is the most relevant. The resulting matches are scored, and the most targeted messages are selected (step 825). This step evaluates selected initiatives based upon the number of key-path matches and the relative weight of each matched key value. This evaluation results in an initiative score value for each selected initiative.

After initiatives have been selected, runtime offer evaluator controller 705 utilizes offer update tracking 720 to update message usage statistics (step 830). This step updates initiative usage counters and is helpful to future initiative creation. Also, a log of inbound request parameters and the corresponding selected initiatives is created to similarly aid in the future. These statistics are essential to future trend prediction and impact analysis. Usage statistics are maintained in runtime offer information repository 310 and can be used to populate a similar section of DSS information repository 210. When the update of the usage counters is complete, the selected message(s) is integrated into a response to marketing host (step 835). This step applies the selected initiative to the key-path combination in the request that prompted the selection. Finally, the request from marketing host 220 is reconstructed with the initiative included and the response returned to marketing host 220 in a results array (step 840). This reconstruction is performed by data translation services 710 and includes steps to convert the results array into a format that can be used by marketing host 220. In this manner, relevant marketing initiatives can be presented to a customer as travel decisions are actually being made.

While the present invention has been described in connection with a preferred embodiment, many modifications will be readily apparent to those skilled in the art, and this application is intended to cover any adaptations or variations thereof. For example, the system and method above may be applied to other types of customer service industries such as retail sales and real estate, and other types of travel industries such as bus lines, cruise lines and the like without departing from the scope of the invention. This invention should be limited only by the claims and equivalents thereof.

What is claimed is:

1. A method for creating at marketing initiative comprising the steps, performed by a processor, of:
    inputting offer parameters for a new initiative, including an initiative time period and an initiative description;
    associating customer selection criteria with the offer parameters;
    determining a likelihood that the new initiative will be effective prior to use of the new initiative using stored statistics reflecting hit rates based on characteristics of other past initiatives, where the hit rates indicate the number of times an initiative was selected as being relevant to a customer request;
    providing a result indicating the effectiveness of the new initiative; and
    storing the new initiative in a database based on the result, wherein said determining step comprises:
        receiving, at a runtime offers subsystem, a sales request from a marketing host;
        extracting key values from said sales request, said key values including customer selection criteria;
        creating key structures using said key values; compressing said key structures into a series of key-paths; and
        searching said database using the key-paths to determine an initiative that is most relevant to the sales request.

2. The method of claim 1, wherein said inputting step comprises inputting an initiative time period that includes an effective date and an expiration date.

3. The method of claim 1, wherein said database is at least one of a decision support subsystem (DSS) database and a runtime offer database.

4. The method of claim 3, further comprising the steps of:
determining whether the new initiative is to be put into effect immediately;
storing the new initiative in the runtime offer database based on the determination that the new initiative is to be put into effect immediately; and
storing the new initiative in the DSS database based on the determination that the new initiative is not to be put into affect immediately.

5. The method of claim 4, further comprising the step of:
applying data from the DSS database to the runtime offer database periodically in a time-initiated load cycle.

6. The method of claim 1, further comprising:
determining an impact of the new initiative on other initiatives stored in the database.

7. The method of claim 1, further comprising:
sending the most relevant initiative to the marketing host;
presenting the most relevant initiative to a customer; and
tracking initiatives that are presented to customers to assist in market analysis.

8. A sales manager system including a sales manager workstation for creating a marketing initiative comprising:
a sales manager workstation controller including means for entering offer parameters for a new initiative and means for associating customer selection criteria with the offer parameters;
a trend analysis unit using stored statistics reflecting hit rates based on characteristics of other past initiatives to determine a likelihood that the new initiative will be effective prior to use of the new initiative, where the hit rates indicate the number of times an initiative was selected as being relevant to a customer request, wherein a result is provided indicating the effectiveness of the new initiative;
a decision support subsystem (DSS) database, wherein the new initiative is stored in a database based on the result;
a runtime offer database; and
a runtime offers subsystem, said runtime offers subsystem including:
a runtime offer compiler connected to the DSS database, said runtime offer compiler including means for extracting new and updated initiatives from the DSS database and means for transferring said new and updated initiatives to the runtime offer database, wherein said runtime offer database is part of the runtime offers subsystem; and
a runtime offer evaluator connected to the runtime offer database, said runtime offer evaluator including means for extracting key values from a sales request received from a marketing host, means for creating key structures using said key values, means for compressing said key structures into a series of key-paths, and means for searching said runtime offer database using the key-paths to determine an initiative that is most relevant to the sales request.

9. The sales manager system of claim 8, further comprising:
an impact analysis unit for determining an impact of the new initiative on other initiatives stored in the database.

10. The sales manager system of claim 8, further comprising:
means for determining whether the new initiative needs to be put into effect immediately;
means for storing the new initiative in the runtime offer database based on the determination that the new initiative is to be put into effect immediately; and
means for storing the new initiative in the DSS database based on the determination that the new initiative is not to be put into effect immediately.

11. The sales manager system of claim 10, wherein data from the DSS database is applied to the runtime offer database periodically in a time-initiated load cycle.

12. The sales manager of claim 8, wherein said runtime offer evaluator further comprises:
means for sending the most relevant initiative to the marketing host; and
means for tracking initiatives that are presented to customers to assist in market analysis.

13. A sales manager system comprising:
a sales manager workstation for creating a marketing initiative, said sales manager workstation including a sales manager workstation controller including means for entering offer parameters for a new initiative and means for associating customer selection criteria with the offer parameters, a trend analysis unit using stored statistics reflecting hit rates based on characteristics of other past initiatives to determine a likelihood that the new initiative will be effective prior to use of the new initiative, where the hit rates indicate the number of times an initiative was selected as being relevant to a customer request, and an impact analysis unit for determining an impact of the new initiative on other initiatives stored in a database;
a decision support subsystem (DSS) database connected to the sales manager for storing the new initiative;
a runtime offers subsystem connected to the DSS database for using information from a customer request to determine a most targeted initiative; and
a marketing host connected to the runtime offers subsystem, said marketing host including means for sending customer requests to the runtime offers subsystem,
wherein said runtime offers subsystem comprises:
a runtime offer compiler connected to the DSS database, said runtime offer compiler including means for extracting new and updated initiatives from the DSS database and means for transferring said new and updated initiatives to the runtime offer database, wherein said runtime offer database is part of the runtime offers subsystem; and
a runtime offer evaluator connected to the runtime offer database, said runtime offer evaluator including means for extracting key values from a sales request received from a marketing host, means for creating key structures using said key values, means for compressing said key structures into a series of key-paths, and means for searching said runtime offer database using the key-paths to determine an initiative that is most relevant to the sales request.

14. The sales manager of claim 13, wherein said runtime offer evaluator further comprises:
means for sending the most relevant initiative to the marketing host; and
means for tracking initiatives that are presented to customers to assist in market analysis.

15. A sales manager system including a sales manager workstation for creating a marketing initiative comprising:
- a sales manager workstation controller including means for entering offer parameters for a new initiative;
- a trend analysis unit using stored statistics associated with past initiatives to determine a likelihood that the new initiative will be effective, wherein a result is provided indicating the effectiveness of the new initiative;
- a database in communication with said trend analysis unit, wherein the database is at least one of a decision support subsystem (DSS) database and a runtime offer database, and wherein the new initiative is stored in the database based on the result; and
- a runtime offers subsystem, said runtime offers subsystem comprising:
  - a runtime offer compiler connected to the DSS database, said runtime offer compiler including means for extracting new and updated initiatives from the DSS database and means for transferring said new and updated initiatives to the runtime offer database, wherein said runtime offer database is part of the runtime offers subsystem; and
  - a runtime offer evaluator connected to the runtime offer database, said runtime offer evaluator including means for extracting key values from a sales request received from a marketing host, means for creating key structures using said key values, means for compressing said key structures into a series of key-paths, and means for searching said runtime offer database using the key-paths to determine an initiative that is most relevant to the sales request.

16. A method for creating a marketing initiative comprising:
- receiving offer parameters for a new initiative;
- determining a likelihood that the new initiative will be effective using stored statistics associated with past initiatives, wherein a result is provided indicating the effectiveness of the new initiative;
- providing a database that is at least one of a decision support subsystem (DSS) database and a runtime offer database;
- storing the new initiative in the database based on the result;
- extracting new and updated initiatives from the DSS database;
- transferring the new and updated initiatives to the runtime offer database;
- extracting key values from a sales request received from a marketing host;
- creating key structures using the key values;
- compressing the key structures into a series of key-paths; and
- searching the runtime offer database using the key-paths to determine an initiative that is most relevant to the sales request.

\* \* \* \* \*